(12) United States Patent
Denisowski

(10) Patent No.: US 11,550,021 B2
(45) Date of Patent: Jan. 10, 2023

(54) METHOD AND DIRECTION FINDING SYSTEM FOR LOCALIZING A NEAR VERTICAL INCIDENCE SKYWAVE EMITTER

(71) Applicant: Rohde & Schwarz GmbH & Co. KG, Munich (DE)

(72) Inventor: Paul Denisowski, Munich (DE)

(73) Assignee: Rohde & Schwarz GmbH & Co. KG, Munich (DE)

(*) Notice: Subject to any disclaimer, the term of this patent is extended or adjusted under 35 U.S.C. 154(b) by 134 days.

(21) Appl. No.: 17/104,778

(22) Filed: Nov. 25, 2020

(65) Prior Publication Data

US 2022/0163617 A1 May 26, 2022

(51) Int. Cl.
  *G01S 3/02* (2006.01)
  *G01S 5/02* (2010.01)
  *G01S 5/04* (2006.01)
  *G01S 5/06* (2006.01)

(52) U.S. Cl.
  CPC ............ *G01S 5/0273* (2013.01); *G01S 5/04* (2013.01); *G01S 5/0244* (2020.05); *G01S 5/06* (2013.01)

(58) Field of Classification Search
  CPC ........ G01S 5/0244; G01S 5/0273; G01S 5/04; G01S 5/06; G01S 5/12
  USPC .......................................... 342/451, 417, 450
  See application file for complete search history.

(56) References Cited

U.S. PATENT DOCUMENTS

| | | | | |
|---|---|---|---|---|
| 5,444,451 A | * | 8/1995 | Johnson | G01S 3/46 342/453 |
| 5,945,948 A | | 8/1999 | Buford et al. | |
| 6,061,022 A | * | 5/2000 | Menegozzi | G01S 3/48 342/442 |
| 6,784,840 B2 | * | 8/2004 | Menegozzi | G01S 3/023 342/449 |
| 7,233,799 B2 | * | 6/2007 | Spain, Jr. | H04W 64/00 455/456.6 |

(Continued)

FOREIGN PATENT DOCUMENTS

WO  WO-2022023116 A1 *  2/2022  ............... G01S 5/02

*Primary Examiner* — Chuong P Nguyen
(74) *Attorney, Agent, or Firm* — Christensen O'Connor Johnson Kindness PLLC

(57) ABSTRACT

A method of localizing a near vertical incidence skywave emitter. At a first site a first elevation angle of an incoming signal issued by the near vertical incidence skywave emitter is measured. At a second site a second elevation angle of an incoming signal issued by the near vertical incidence skywave emitter is measured, wherein the second site is different to the first site. The first elevation angle measured and the second elevation angle measured are converted into a first length and a second length respectively, which represent the distance between the respective site and the estimated location of the near vertical incidence skywave emitter. The respective length is processed, thereby generating an estimated area of the near vertical incidence skywave emitter for each of the different sites such that at least two different estimated areas are generated. The estimated areas for each site are superimposed, thereby obtaining an area of interest encompassing the estimated location of the near vertical incidence skywave emitter. Further, a direction finding system is described.

20 Claims, 3 Drawing Sheets

(56) References Cited

U.S. PATENT DOCUMENTS

| | | | |
|---|---|---|---|
| 7,254,401 B2* | 8/2007 | Keranen | G01S 5/14 |
| | | | 342/88 |
| 7,706,814 B2* | 4/2010 | Sillasto | G01S 5/14 |
| | | | 455/456.1 |
| 10,008,778 B2* | 6/2018 | Jones, III | H01Q 21/26 |
| 10,830,861 B2* | 11/2020 | Stein | G01S 3/74 |
| 2002/0094820 A1 | 7/2002 | Keranen et al. | |
| 2004/0180671 A1 | 9/2004 | Spain, Jr. | |
| 2005/0255865 A1 | 11/2005 | Sillasto et al. | |
| 2016/0064831 A1 | 3/2016 | Jones, III | |
| 2018/0024220 A1* | 1/2018 | Massarella | G01S 3/043 |
| | | | 342/417 |
| 2018/0172795 A1* | 6/2018 | Stein | G01S 3/043 |

\* cited by examiner

METHOD AND DIRECTION FINDING SYSTEM FOR LOCALIZING A NEAR VERTICAL INCIDENCE SKYWAVE EMITTER

FIELD OF THE DISCLOSURE

Embodiments of the present disclosure relate generally to a method of localizing a near vertical incidence skywave (NVIS) emitter. Further, embodiments of the present disclosure relate to a direction finding system for localizing a near vertical incident skywave emitter.

BACKGROUND

Generally, direction finding (DF) is a well-known technology in the state of the art. In fact, direction finding, also called radio direction finding (RDF), concerns the measurement of direction from which a received signal was transmitted in order to locate the respective emitter of the signal. Therefore, direction finding may refer to radio or other forms of wireless communication, including radar signals and other signals emitted over-the-air (OTA). By combining the information gathered from two or more suitably spaced direction finding sites, for instance by direction finding base stations, the source of a transmission may be located via triangulation techniques. Alternatively, a single mobile direction finding station may be used that is moved to different sites in order to gather information at the respective sites.

Besides the usual radio transmitters that transmit radio signals substantially parallel to the ground, so-called near vertical incidence skywave (NVIS) emitters are also known that are inter alia used by broadcasting services and/or radio amateurs. The radio waves emitted by the near vertical incidence skywave emitters travel near vertically upwards into the atmosphere, where the respective radio waves are reflected back down such that these signals can be received within a circular region up to 650 kilometers from the respective emitter. Hence, NVIS emitters are enabled to provide radio signals in a distance range up to 650 kilometers.

For direction finding of a NVIS emitter, the respective direction finding systems typically attempt to locate the respective emitter based on weak groundwave components of the signals travelling near vertically upwards, also called low angle components. However, this approach is inaccurate and inefficient, as the respective groundwave components usually have a very low signal level, yielding weak signals received and, therefore, inaccurate measurement results.

Accordingly, there is a need for a possibility to locate a NVIS emitter in a more accurate manner.

SUMMARY

Embodiments of the present disclosure provide a method of localizing a near vertical incidence skywave emitter. In an embodiment, the method comprises the steps of:

measuring at a first site a first elevation angle of an incoming signal issued by the near vertical incidence skywave emitter;

measuring at a second site a second elevation angle of an incoming signal issued by the near vertical incidence skywave emitter, wherein the second site is different to the first site;

converting the first elevation angle measured into a first length representing the distance between the first site and the estimated location of the near vertical incidence skywave emitter;

converting the second elevation angle measured into a second length representing the distance between the second site and the estimated location of the near vertical incidence skywave emitter;

processing the respective length, thereby generating an estimated area of the near vertical incidence skywave emitter for each of the different sites such that at least two different estimated areas are generated; and superimposing the estimated areas for each site, thereby obtaining an area of interest encompassing the estimated location of the near vertical incidence skywave emitter.

Further, the present disclosure provides a direction finding system for localizing a near vertical incidence skywave emitter. In an embodiment, the direction finding system comprises at least one processing unit, such as a processor or processor circuit, and at least one direction finding station. The at least one direction finding station is configured to measure at a first site a first elevation angle of an incoming signal issued by the near vertical incidence skywave emitter. The at least one direction finding station is configured to measure at a second site a second elevation angle of an incoming signal issued by the near vertical incidence skywave emitter. The at least one processing unit is configured to convert the respective elevation angle measured into a corresponding length. The length represents the distance between the respective site of the direction finding station and the estimated location of the near vertical incidence skywave emitter. The at least one processing unit is configured to process the respective length, thereby generating an estimated area of the near vertical incidence skywave emitter for each of the sites such that at least two different estimated areas are generated. The at least one processing unit is configured to superimpose the estimated areas for each of the sites, thereby obtaining an area of interest encompassing the estimated location of the near vertical incidence skywave emitter.

Accordingly, a precise locating (direction finding) of the near vertical incidence skywave (NVIS) emitter is possible, as the elevation angle of the signal received is correlated with a distance to the NVIS emitter for the respective site at which the respective elevation angle has been measured by the at least one direction finding station. Accordingly, the present disclosure is based on the finding that the elevation angle of received NVIS signals can be correlated to the respective distance from the site of detection, namely the site at which the at least one direction finding station measures the elevation angle, to the location of the respective NVIS emitter. Therefore, measurements of the elevation angles at different sites allow to determine the location of the NVIS emitter in an accurate manner by computing or rather determining the area of interest that encompasses the estimated location. In some embodiments, the respective estimated areas obtained for each site are superimposed, thereby obtaining an area in which the estimated areas overlap. Typically, this area being the area of interest is smaller than each of the estimated areas.

The idea is to convert the measured elevation angle into a length information. Hence, the first elevation angle measured and the second elevation angle measured are converted into a first length and a second length respectively, which represent the respective distance between the respective site and the estimated location of the near vertical incidence skywave emitter.

In general, a greater measured elevation angle relates to a shorter distance between the site of detection and the NVIS emitter, as the signals reflected at the atmosphere, for example the ionosphere, impinge on the at least one direction finding station at a greater angle, namely an angle closer to 90°. Put differently, a larger distance to the location of the NVIS emitter results in a more flatten impinging angle at the direction finding station, resulting in a lower elevation angle. Therefore, a correlation between the elevation angle measured at a respective site and the distance of the site to the location of the NVIS emitter is given, which is used for localizing the NVIS emitter in a more accurate manner.

Afterwards, the respective lengths determined from the elevation angles measured are used to determine the respective estimated areas. Accordingly, a first estimated area associated with the first elevation angle or rather the first length as well as a second estimated area associated with the second elevation angle or rather the second length are generated accordingly. The respective estimated areas indicate a roughly estimated area in which the NVIS emitter is expected based on the measurement results obtained at only one site. When superimposing the estimated areas obtained at two different sites, the roughly estimated areas overlap with each other, yielding an overlapping portion of both estimated areas, which corresponds to the area of interest. In this area of interest, the NVIS emitter is probably located.

Accordingly, the respective lengths, namely the first length and the second length, are processed simultaneously or rather subsequently, thereby generating a first estimated area of the near vertical incidence skywave emitter for the first site and a second estimated area of the near vertical incidence skywave emitter for the second site. Hence, at least two different estimated areas are generated, namely the first estimated area associated with the first site as well as the second estimated area associated with the second site.

As mentioned, the respective elevation angle is measured by at least one direction finding station.

The at least one direction finding station may be a single mobile station that is moved, for instance within a certain terrain, in order to arrive at the at least two different sites, namely the first one and the second one, at which the respective elevation angles are measured. The single mobile direction finding station may be installed on a vehicle.

Alternatively, a ground-based direction finding station may be provided at each site. The respective ground-based direction finding station measures the elevation angle at the respective site. In some embodiments the ground-based direction finding stations may be fixed at their respective sites which means that they are not mobile, namely immobile.

The elevation angle can be measured at each site in a known manner by the direction finding station. For instance, the direction finding station comprises two or more direction finding antennas that are used to determine the elevation angle at the respective site, wherein each of the antennas provide information that is used to determine the elevation angle.

The (exact) location of the NVIS emitter may correspond to the center of the area of interest, for example the geometrical center of the area of interest. Hence, the (exact) location of the NVIS emitter can be assumed in an approximate manner.

An aspect provides that the estimated areas each relate to a circle around the respective site, wherein the circle has a radius that corresponds to the length associated with the elevation angle measured. Accordingly, it is assumed that the NVIS emitter is located at the respective distance that corresponds to the length determined from the elevation angle. For a single site, namely the site of detection or rather the site of elevation angle measurement, it is not possible to identify the respective direction, but the distance due to the evaluation of the elevation angle measured. In some embodiments, it is assumed that the NVIS emitter has to be located at the distance in a circular manner around the respective site. When superimposing the circles surrounding each of the respective sites, an area is generated in which the respective circles overlap with each other partly, namely the area of interest. Accordingly, the area of interest in which the estimated location of the near vertical incidence skywave emitter is provided is significantly reduced compared to the individual estimated areas.

For instance, the area of interest corresponds to an area in which the estimated areas intersect each other. Hence, the estimated areas overlap each other, thereby intersecting each other at least partly.

In general, the measured elevation angle may be converted into a respective length with a certain margin, for instance 10 kilometers plus minus 500 meters. Accordingly, the estimated areas each may have a certain width that corresponds to the respective margin.

In case that no margin is provided, the estimated areas correspond to a line, for example a circular line around the respective site. Then, the area of interest corresponds to the intersecting points of the circular lines. In case of two sites to be taken into account, usually two intersecting points of the circular lines around the respective sites may be provided, resulting in ambiguous locations of the NVIS emitter, namely two different ones.

When selecting the at least two different sites perfectly, the two circular lines corresponding to the estimated areas may also intersect each other in only a single point that is unambiguous.

Another aspect provides that the respective elevation angle measured is converted into the corresponding length by a processing unit. The processing unit relates to a processing circuit that is configured to execute programs and/or algorithms in order to convert the elevation angle measured into the corresponding length. For this purpose, a respective formula may be provided that is used in order to convert the elevation angle measured into the corresponding length.

According to another aspect, the respective length is processed by a processing unit such that the estimated area of the near vertical incidence skywave emitter for the respective site is generated. As mentioned above, a respective margin may be taken into account when determining the estimated area. Hence, a circle with a width may be provided, wherein the width of the circle corresponds to the margin applied. Put differently, the center line of the circular ring with the respective width corresponds to the length obtained from the elevation angle measured, wherein the inner and outer radial boundaries of the circular ring are defined by the margin(s) applied.

Further, the respective estimated areas may be superimposed by a processing unit. The processing unit determines or rather receives the estimated areas that are superimposed.

For instance, the same processing unit may be used that converts the respective elevation angle measured into the corresponding length and/or processes the respective length (s) in order to generate the estimated area(s). In some embodiments, the processing unit that superimposes the estimated areas may have determined the respective estimated areas by itself previously. Alternatively, the processing unit receives the estimated areas from other processing units, for example processing units associated with the direction finding stations.

According to another aspect, at least a third elevation angle of an incoming signal issued by the near vertical incidence skywave emitter is measured at a third site that is different to the first site and the second site. The third elevation angle measured is converted into a third length representing the distance between the third site and the estimated location of the near vertical incidence skywave emitter. The third length is processed such that a third estimated area of the near vertical incidence skywave emitter is generated for the third site, namely another estimated area. The third estimated area is superimposed with the first and second estimated areas in order to obtain the area of interest. The accuracy of the direction finding, namely the localizing of the NVIS emitter, can be increased by using three or more measurement data sets gathered at the different sites in order to narrow the area of interest. Each of the sites is associated with a unique estimated area that is derived from the elevation angle measured at the respective site. Since more than two, for example three or more than three, estimated areas are superimposed with each other, the respective intersection area is narrowed, for example minimized, which corresponds to the area of interest. Therefore, the accuracy of the direction finding method is increased accordingly.

For instance, the direction finding system comprises three (ground-based) direction finding stations located at different sites, In some embodiments wherein the direction finding system comprises more than three direction finding stations located at different sites. The direction finding stations may be immobile at the respective sites.

Alternatively, the direction finding system comprises a single mobile direction finding station that is moved or rather driven to the different sites, for example the three different sites, for measuring the elevation angles at these sites.

The at least one processing unit may be a main processing unit that is separately formed with respect to the at least two direction finding stations, wherein the main processing unit may be configured to receive the elevation angles measured from the at least two direction finding stations. Accordingly, the main processing unit is enabled to convert the elevation angles measured into the respective lengths. For this purpose, the main processing unit is connected with the at least one direction finding station in order to gather the respective data sets or rather information.

In some embodiments, the main processing unit is integrated within the single mobile direction finding station that is moved or rather driven to the respective different sites. This ensures that the information, namely the elevation angle measured, is directly obtained by the main processing unit at the respective site for further processing.

Moreover, several direction finding stations may be provided, wherein each of the direction finding stations may comprise its own processing unit. The several direction finding stations may be ground-based ones that are located at the respective sites. The own processing units of the direction finding stations may communicate with each other or rather with a central/main processing unit.

For instance, each of the own processing units is configured to convert the respective elevation angle measured into a corresponding length. Thus, each direction finding station is enabled to convert the elevation angle measured into the corresponding length. Then, the direction finding stations may forward the respective lengths to a central/main processing unit for further processing, for example the steps mentioned above.

Furthermore, each of the own processing units may be configured to send the elevation angle measured and/or the length converted to the processing unit of the other direction finding station. Accordingly, one of the own processing units may act as the main processing unit that is configured to gather the elevation angle measured and/or the length converted from the other direction finding stations as well in order to process all information gathered accordingly, namely the elevation angles measured and/or the lengths converted which are associated with all sites.

According to another aspect, each of the own processing units is configured to receive the elevation angle measured and/or the length converted from the processing unit of the other direction finding station. As mentioned above, the own processing units may act as the main processing unit that is configured to superimpose the estimated areas for each of the sites, thereby obtaining an area of interest encompassing the estimated location of the near vertical incidence skywave emitter.

Alternatively or additionally, each of the own processing units is configured to send the elevation angle measured and/or the length converted to a separately formed main processing unit. The separately formed main processing unit may relate to a server that is configured to process the information gathered by the direction finding units, for example their own processing units. Hence, the separately formed main processing unit is enabled to collect and further process the information in order to determine the estimated location of the NVIS emitter.

The above-mentioned features and characteristics apply for the method and the direction finding system in a similar manner such that they are interchangeable.

Furthermore, each of the features and characteristics described above can be applied to the direction finding system and the method described before.

As used herein, the term "processing unit" may refer to a combination of hardware (e.g. a processor such as an integrated circuit or other circuitry) and software (e.g. machine- or processor-executable instructions, commands, or code such as firmware, programming, or object code). Furthermore, a combination of hardware and software may include hardware only (i.e. a hardware element with no software elements), software hosted at hardware (e.g. software that is stored at a memory and executed or interpreted at a processor), or hardware with the software hosted thereon. In some embodiments, the hardware may, inter alia, comprise a central processing unit (CPU), a graphics processing unit (GPU), a field programmable gate array (FPGA), a digital signal processor (DSP), an application specific integrated circuit (ASIC), or other types of electronic circuitry.

DESCRIPTION OF THE DRAWINGS

The foregoing aspects and many of the attendant advantages of the claimed subject matter will become more readily appreciated as the same become better understood by reference to the following detailed description, when taken in conjunction with the accompanying drawings, wherein:

DETAILED DESCRIPTION

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed.

Figure 1:
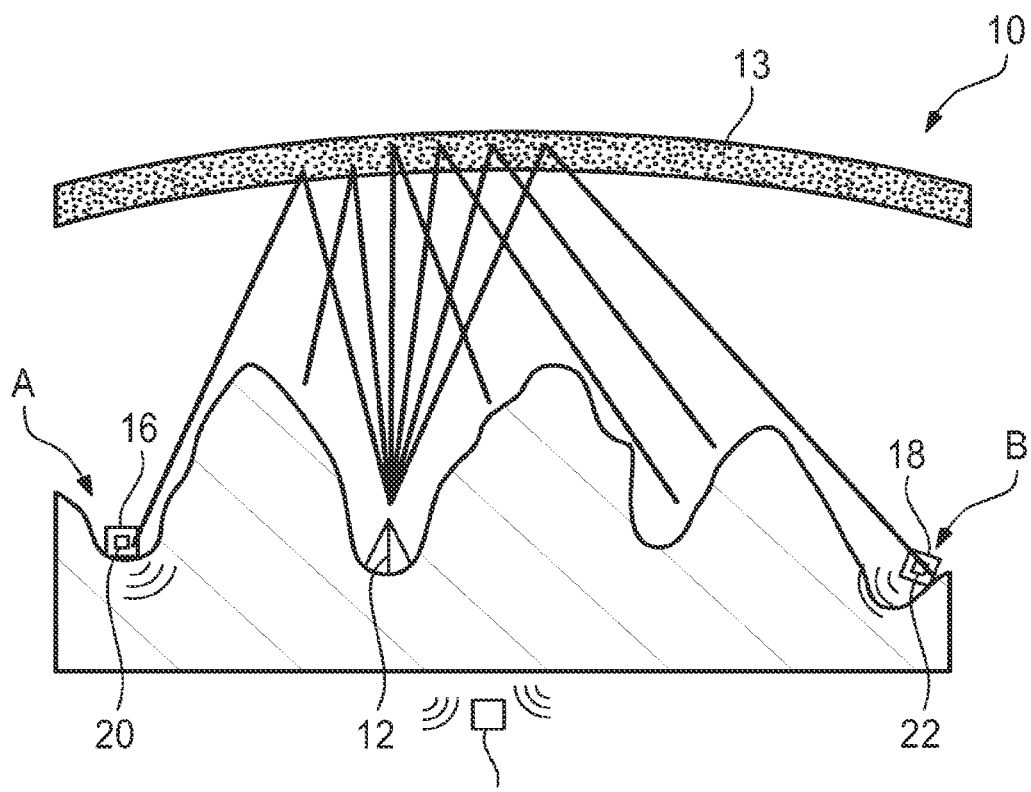
FIG. 1 schematically shows a direction finding system according to a first embodiment of the present disclosure.

In FIG. 1, a direction finding system 10 for localizing a near vertical incidence skywave emitter 12 is shown, which emits signals that travel near vertically upwards into the atmosphere 13 at which they are reflected. In the shown embodiment, the direction finding system 10 comprises at least one processing unit 14 that is established as, for example, a main processing unit.

Moreover, the direction finding system 10 comprises two direction finding stations 16, 18 that are located at different sites A, B. Thus, the first direction finding station 16 is located at a first site A that is different to the second site B at which the second direction finding station 18 is located. In the shown embodiments, the direction finding stations 16, 18 are ground-based ones that are located at the respective sites A, B. The direction finding stations 16, 18 each measure at its respective site A, B an elevation angle of an incoming signal that has been issued by the near vertical incidence skywave emitter 12.

Figure 5:
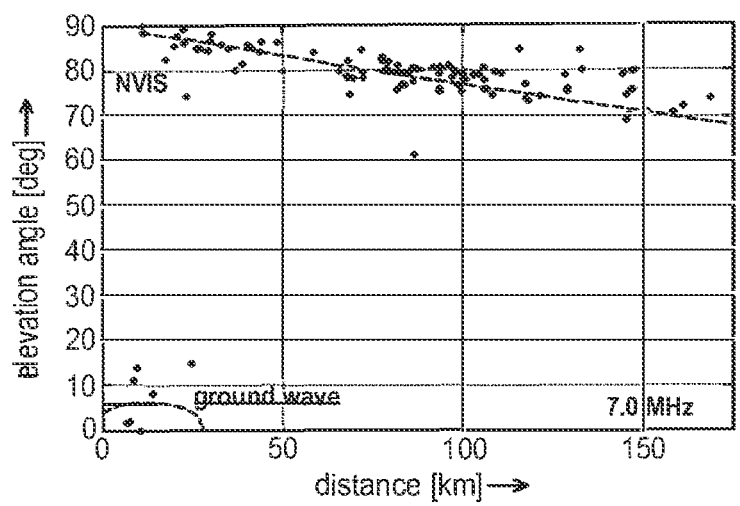
FIG. 5 shows a diagram illustrating the relationship between the elevation angle measured and the distance.
Figure 6:
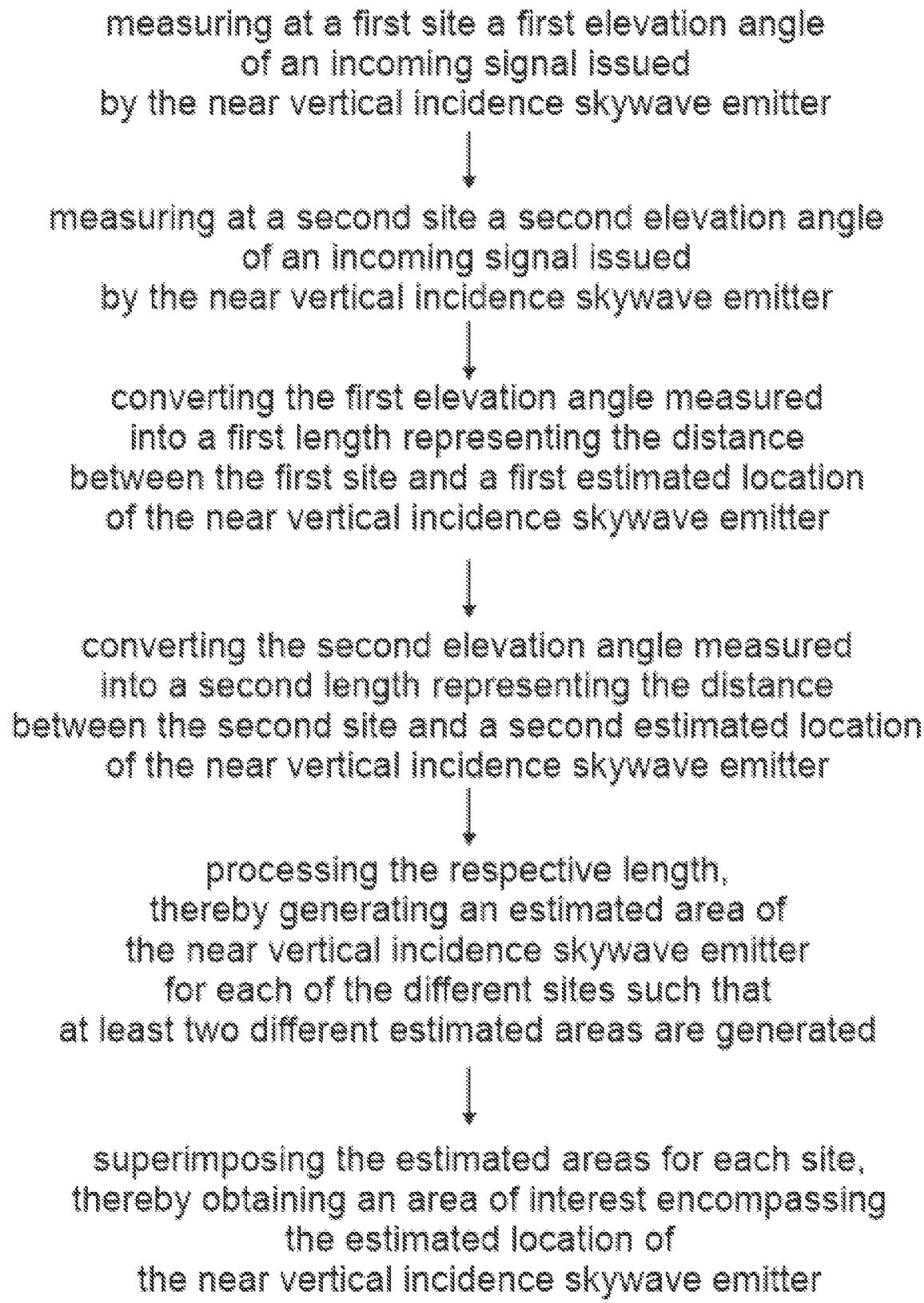
FIG. 6 shows a flow chart of a representative method for localizing a near vertical incidence skywave emitter.

In the shown embodiment, the direction finding stations 16, 18 also comprise respective processing units 20, 22 that are configured to convert the respective elevation angle measured at the dedicated site A, B into a corresponding length. In FIG. 5, a diagram is shown that illustrates the correlation of the elevation angle and the distance, namely the length. By taking the trend line shown in FIG. 5 into account, the elevation angle measured can be converted into a respective length/distance.

The length determined based on the elevation angle measured may be forwarded from the respective own processing unit 20, 22 to the main processing unit 14 that is connected with the processing units 20, 22 of the direction finding stations 16, 18 in a signal-transmitting manner, for instance in a wireless manner Hence, the main processing unit 14 receives the lengths converted from each of the direction finding stations 16, 18, for example their respective processing units 20, 22. Alternatively, the main processing unit 14 receives the elevation angles measured and converts the respective elevation angles measured into the corresponding lengths.

Generally, the length represents a distance between the respective site A, B of the direction finding station 16, 18 and the estimated location of the near vertical incidence skywave emitter 12.

Figure 2:
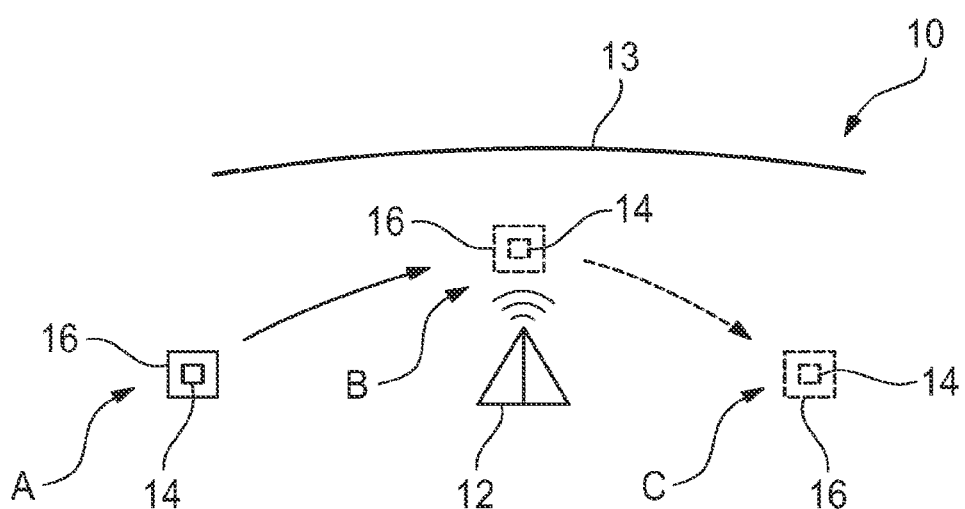
FIG. 2 schematically shows a direction finding system according to a second embodiment of the present disclosure.

In FIG. 2, a second embodiment of the direction finding system 10 is shown, wherein a single mobile direction finding station 16 is illustrated that can be driven/moved such that the single mobile direction finding station 16 reaches different sites A, B, C at which the respective elevation angle can be measured. Thus, three different measurement data sets, namely three different elevation angles, can be measured at the different sites A, B, C.

The single mobile direction finding station 16 may comprise the only processing unit 14, for example in an integrated manner Thus, the processing unit 14 is also moved/driven together with the single mobile direction finding station 16, ensuring that the elevation angle measured can be further processed at the respective site A, B, C.

Irrespective of the embodiment, the (main) processing unit 14 and/or each of the own processing units 20, 22 may process the respective lengths converted from the elevation angles measured. By processing the respective lengths, an estimated area of the near vertical incidence skywave emitter 12 for each of the sites A, B (and C) may be generated such that at least two different estimated areas are generated, namely a first estimated area 24 for the first site A, a second estimated area 26 for the second site B as well as a third estimated area 28 for the third site C. These estimated areas 24-28 are schematically shown in FIG. 3.

In the shown example, the estimated areas 24-28 are illustrated by circles having a certain width. The width of the circles, namely the estimated areas 24-28, corresponds to a margin that is applied to the length converted from the elevation angle measured. In other words, the elevation angle measured is converted into a certain length that corresponds to a distance from the respective site A, B, C. Then, a margin is also considered, thereby widening the circle line (illustrated by dashed lines in FIG. 3) to a circle with a respective width, wherein the inner radial boundary as well as the outer radial boundary are defined by the margin(s) applied.

Then, the (main) processing unit 14 and/or the processing units 20, 22 are/is configured to superimpose the estimated areas 24-28, namely the different circles, for each A, B, C. The estimated areas 24-28 overlap in a certain area that corresponds to an area of interest 30 which is obtained by superimposing the estimated areas 24-28. The area of interest encompasses the estimated location of the near vertical incidence skywave emitter 12.

Figure 3:
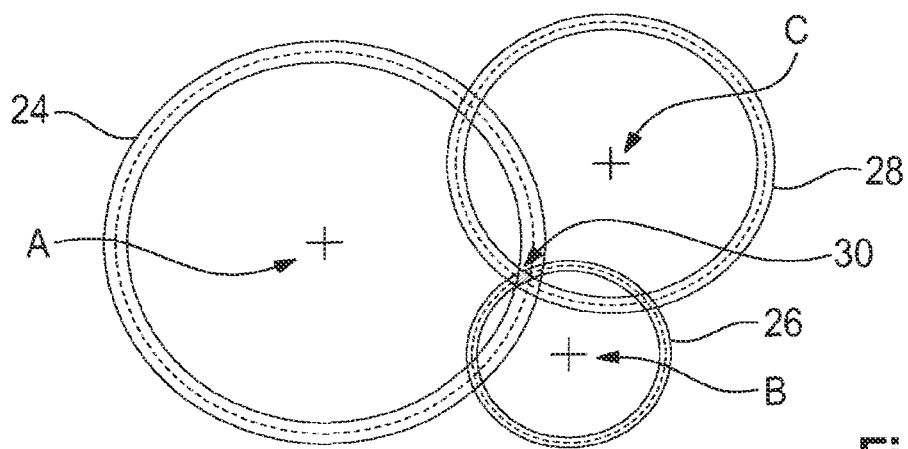
FIG. 3 schematically shows an overview that illustrates the estimated areas of three different sites as well as the area of interest.

As shown in FIG. 3, the estimated location of a near vertical incidence skywave emitter 12 corresponds to an intersecting area of the circles obtained, namely the estimated areas 24-28 for each site A, B, C. Therefore, it can be assumed that the near vertical incidence skywave emitter 12 is located within the respective area of interest 30.

Generally, the estimated areas 24-28 each relate to a circle (line) around the respective site A, B, C at which the (mobile) direction finding station 16, 18 is located when measuring the elevation angle that is converted afterwards into a length. The length is used for determining the respective radius of the circle (line), wherein the length corresponds to a distance of the site A, B, C to the estimated location of the NVIS emitter 12.

As shown in FIGS. 2 and 3, three elevation angles measured at three different sites A, B, C are taken into account. At the respective sites A, B, C three different (ground-based) direction finding stations may be provided or rather the single mobile direction finding station is moved to the respective sites A, B, C. In any case, three different elevation angles are measured at these different sites A, B, C.

The elevation angles measured at the sites A, B, C are converted into lengths which in turn are used to generate the estimated areas 24-28 of the near vertical incidence skywave emitter 12. Afterwards, the estimated areas 24-28 are superimposed such that an intersecting or rather overlapping area is obtained that corresponds to the area of interest 30 within which the near vertical incidence skywave emitter 12 is located.

As mentioned above, the respective elevation angle is measured at the dedicated site A, B and/or C by a ground-based direction finding station 16, 18 (embodiment shown in FIG. 1) or rather by a mobile direction finding station 16 (embodiment shown in FIG. 2) that is moved in order to arrive at the at least two different sites A, B and/or C.

The respective processing of the elevation angle measured at the sites A, B, C may be processed by the single processing unit 14, namely the main processing unit 14, and/or own processing units 20, 22 associated with the direction finding stations 16, 18. Of course, the respective processing units 14, 20, 22 communicate with each other in order to exchange data among each other.

For instance, one or rather each of the own processing units 20, 22 may be configured to process data/information gathered from the other processing units 20, 22.

Accordingly, each of the processing units 20, 22 may be configured to convert the respective elevation angle measured into a corresponding length. These processing units 20, 22 may also be configured to send the elevation angle measured and/or the length converted to the processing unit 20, 22 of the other direction finding station 16, 18. Accordingly, each of the processing units 20, 22 is also configured to receive the elevation angle measured and/or the length converted from the processing unit 20, 22 of the other direction finding station 16, 18.

Alternatively, each of the processing units 20, 22 is configured to send the elevation angle measured and/or the length converted to the separately formed main processing unit 14.

Therefore, the main processing unit 14 and/or the processing units 20, 22 may generate the respective estimated areas 24-28 and/or superimpose the estimated areas 24-28 in order to obtain the area of interest 30 as shown in FIG. 3.

Figure 4:
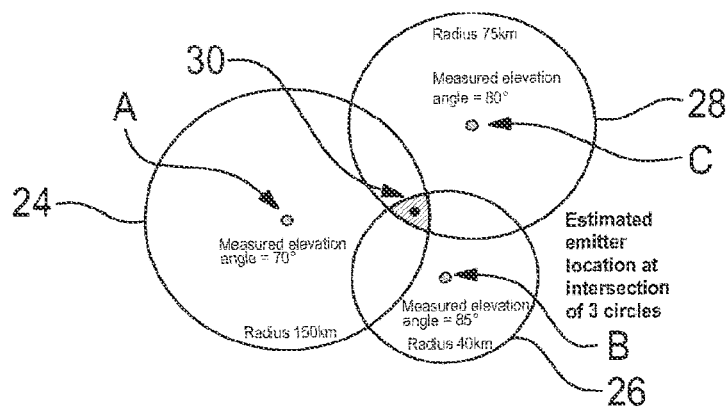
FIG. 4 schematically shows another overview that illustrates the estimated areas of three different sites as well as the area of interest.

In FIG. 4, an alternative is shown in which the estimated areas 24-28 relate to circles (instead of circle lines with a certain width). The estimated areas 24-28, namely the circles, overlap with each other when superimposing the estimated areas 24-28 for each of the sites A, B, C, resulting in an overlap area. The overlap area corresponds to the area of interest 30 that encompasses the estimated location of the NVIS emitter 12 as shown in FIG. 4.

Certain embodiments disclosed herein utilize circuitry (e.g., one or more circuits) in order to implement standards, protocols, methodologies or technologies disclosed herein, operably couple two or more components, generate information, process information, analyze information, generate signals, encode/decode signals, convert signals, transmit and/or receive signals, control other devices, etc. Circuitry of any type can be used. It will be appreciated that the term "information" can be use synonymously with the term "signals" in this paragraph. It will be further appreciated that the terms "circuitry," "circuit," "one or more circuits," etc., can be used synonymously herein In an embodiment, circuitry includes, among other things, one or more computing devices such as a processor (e.g., a microprocessor), a central processing unit (CPU), a digital signal processor (DSP), an application-specific integrated circuit (ASIC), a field-programmable gate array (FPGA), a system on a chip (SoC), or the like, or any combinations thereof, and can include discrete digital or analog circuit elements or electronics, or combinations thereof. In an embodiment, circuitry includes hardware circuit implementations (e.g., implementations in analog circuitry, implementations in digital circuitry, and the like, and combinations thereof).

In an embodiment, circuitry includes combinations of circuits and computer program products having software or firmware instructions stored on one or more computer readable memories that work together to cause a device to perform one or more protocols, methodologies or technologies described herein. In an embodiment, circuitry includes circuits, such as, for example, microprocessors or portions of microprocessor, that require software, firmware, and the like for operation. In an embodiment, circuitry includes one or more processors or portions thereof and accompanying software, firmware, hardware, and the like.

In some examples, the functionality described herein can be implemented by special purpose hardware-based computer systems or circuits, etc., or combinations of special purpose hardware and computer instructions.

Of course, in some embodiments, two or more of these components, or parts thereof, can be integrated or share hardware and/or software, circuitry, etc. In some embodiments, these components, or parts thereof, may be grouped in a single location or distributed over a wide area. In circumstances were the components are distributed, the components are accessible to each other via communication links.

The present application may reference quantities and numbers. Unless specifically stated, such quantities and numbers are not to be considered restrictive, but exemplary of the possible quantities or numbers associated with the present application. Also in this regard, the present application may use the term "plurality" to reference a quantity or number. In this regard, the term "plurality" is meant to be any number that is more than one, for example, two, three, four, five, etc. The terms "about," "approximately," "near," etc., mean plus or minus 5% of the stated value. For the purposes of the present disclosure, the phrase "at least one of A and B" is equivalent to "A and/or B" or vice versa, namely "A" alone, "B" alone or "A and B.". Similarly, the phrase "at least one of A, B, and C," for example, means (A), (B), (C), (A and B), (A and C), (B and C), or (A, B, and C), including all further possible permutations when greater than three elements are listed.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The embodiments of the invention in which an exclusive property or privilege is claimed are defined as follows:

1. A method of localizing a near vertical incidence skywave emitter, the method comprising:
    measuring at a first site a first elevation angle of an incoming signal issued by the near vertical incidence skywave emitter;

measuring at a second site a second elevation angle of an incoming signal issued by the near vertical incidence skywave emitter, wherein the second site is different to the first site;

converting the first elevation angle measured into a first length representing the distance between the first site and a first estimated location of the near vertical incidence skywave emitter, wherein the first elevation angle of the signal received is correlated with the distance to the near vertical incidence skywave emitter for the first site at which the first elevation angle has been measured;

converting the second elevation angle measured into a second length representing the distance between the second site and a second estimated location of the near vertical incidence skywave emitter, wherein the second elevation angle of the signal received is correlated with the distance to the near vertical incidence skywave emitter for the second site at which the second elevation angle has been measured;

processing the respective length, thereby generating an estimated area of the near vertical incidence skywave emitter for each of the different sites such that at least two different estimated areas are generated; and superimposing the estimated areas for each site, thereby obtaining an area of interest encompassing the location of the near vertical incidence skywave emitter.

2. The method according to claim 1, wherein the estimated areas each relate to a circle around the respective site, the circle having a radius that corresponds to the length associated with the elevation angle measured.

3. The method according to claim 1, wherein the area of interest corresponds to an area in which the estimated areas intersect each other.

4. The method according to claim 1, wherein the respective elevation angle measured is converted into the corresponding length by a processing unit.

5. The method according to claim 1, wherein the respective length is processed by a processing unit such that the estimated area of the near vertical incidence skywave emitter for the respective site is generated.

6. The method according to claim 1, wherein the respective estimated areas are superimposed by a processing unit.

7. The method according to claim 1, wherein the respective elevation angle is measured by at least one direction finding station.

8. The method according to claim 1, wherein the at least one direction finding station is a single mobile one that is moved in order to arrive at the at least two different sites.

9. The method according to claim 1, a ground-based direction finding station is provided at each site.

10. The method according to claim 1, wherein at least a third elevation angle of an incoming signal issued by the near vertical incidence skywave emitter is measured at a third site that is different to the first site and the second site, wherein the third elevation angle measured is converted into a third length representing the distance between the third site and a third estimated location of the near vertical incidence skywave emitter, wherein the third elevation angle of the signal received is correlated with the distance to the near vertical incidence skywave emitter for the third site at which the third elevation angle has been measured, wherein the third length is processed such that a third estimated area of the near vertical incidence skywave emitter is generated for the third site, and wherein the third estimated area is superimposed with the first and second estimated areas in order to obtain the area of interest.

11. A direction finding system for localizing a near vertical incidence skywave emitter, wherein the direction finding system comprises at least one processing unit and at least one direction finding station, wherein the at least one direction finding station is configured to measure at a first site a first elevation angle of an incoming signal issued by the near vertical incidence skywave emitter, wherein the at least one direction finding station is configured to measure at a second site a second elevation angle of an incoming signal issued by the near vertical incidence skywave emitter, wherein the at least one processing unit is configured to convert the respective elevation angle measured into a corresponding length, the length representing the distance between the respective site of the direction finding station and a respective estimated location of the near vertical incidence skywave emitter, wherein the respective elevation angle of the signal received is correlated with the distance to the near vertical incidence skywave emitter for the respective site at which the respective elevation angle has been measured, wherein the at least one processing unit is configured to process the respective length, thereby generating an estimated area of the near vertical incidence skywave emitter for each of the sites such that at least two different estimated areas are generated, and wherein the at least one processing unit is configured to superimpose the estimated areas for each of the sites, thereby obtaining an area of interest encompassing the estimated location of the near vertical incidence skywave emitter.

12. The direction finding system according to claim 11, wherein the estimated areas each relate to a circle around the respective site of the direction finding station, the circle having a radius that corresponds to the length associated with the elevation angle measured.

13. The direction finding system according to claim 11, wherein the area of interest corresponds to an area in which the estimated areas intersect each other.

14. The direction finding system according to claim 11, wherein the direction finding system comprises one of: three direction finding stations located at different sites and more than three direction finding stations located at different sites.

15. The direction finding system according to claim 11, wherein the at least one processing unit is a main processing unit that is separately formed with respect to the at least one direction finding station, and wherein the main processing unit is configured to receive the elevation angles measured from the at least one direction finding station.

16. The direction finding system according to claim 11, wherein at least two direction finding stations are provided, and wherein each of the at least two direction finding stations comprises a processing unit.

17. The direction finding system according to claim 16, wherein each of the processing units of the at least two direction finding stations is configured to convert the respective elevation angle measured into a corresponding length.

18. The direction finding system according to claim 16, wherein each of the processing units of the at least two direction finding stations is configured to send at least one of the elevation angle measured and the length converted to the processing unit of the other direction finding station.

19. The direction finding system according to claim 16, wherein each of the processing units of the at least two direction finding stations is configured to receive at least one of the elevation angle measured and the length converted from the processing unit of the other direction finding station.

20. The direction finding system according to claim 16, wherein each of the processing units of the at least two direction finding stations is configured to send at least one of the elevation angle measured and the length converted to a separately formed main processing unit.

* * * * *